United States Patent
Schwartz et al.

(10) Patent No.: US 10,507,421 B2
(45) Date of Patent: Dec. 17, 2019

(54) FILTER ELEMENT WITH DEPRESSED SIDE PORTION

(71) Applicant: Cummins Filtration IP, Inc., Columbus, IN (US)

(72) Inventors: Scott W. Schwartz, Cottage Grove, WI (US); Robert A. Bannister, Ames, IA (US); Joel D. Roltgen, DeForest, WI (US); Jeffrey A. Rech, Verona, WI (US); Stephen L. Fallon, Oregon, WI (US); Gregory K. Loken, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 429 days.

(21) Appl. No.: 15/306,934

(22) PCT Filed: May 6, 2015

(86) PCT No.: PCT/US2015/029443
§ 371 (c)(1),
(2) Date: Oct. 26, 2016

(87) PCT Pub. No.: WO2015/171744
PCT Pub. Date: Nov. 12, 2015

(65) Prior Publication Data
US 2017/0050137 A1    Feb. 23, 2017

Related U.S. Application Data

(60) Provisional application No. 61/989,974, filed on May 7, 2014.

(51) Int. Cl.
*B01D 46/24* (2006.01)
*B01D 46/52* (2006.01)
(Continued)

(52) U.S. Cl.
CPC ........ *B01D 46/2411* (2013.01); *B01D 46/521* (2013.01); *B01D 46/522* (2013.01);
(Continued)

(58) Field of Classification Search
CPC ............ B01D 46/2411; B01D 46/2414; B01D 2201/291; B01D 2201/296;
(Continued)

(56) References Cited

U.S. PATENT DOCUMENTS

| 4,725,323 A | 2/1988 | Ostreicher et al. |
| 5,997,674 A | 12/1999 | Rakocy et al. |

(Continued)

FOREIGN PATENT DOCUMENTS

| CN | 1468134 A | 1/2004 |
| CN | 101623578 A | 1/2013 |

(Continued)

OTHER PUBLICATIONS

Second Office Action and translation issued for Chinese Patent Application No. 20150021736.X, dated, Sep. 13, 2018, 12 pages.

(Continued)

*Primary Examiner* — Minh Chau T Pham
(74) *Attorney, Agent, or Firm* — Foley & Lardner LLP

(57) ABSTRACT

A filter element comprising a filter media and an outer surface. The filter media is formed in a closed loop, the closed loop defining a hollow interior extending along a longitudinal axis between a first end of the filter media and a second end of the filter media. The outer surface surrounds a perimeter of the filter element and is defined by a substantially circular first portion and at least one second portion. The first portion is substantially circular at a selected height of the filter media, and the at least one second portion is depressed relative to a circle defined by the substantially circular first portion at the selected height.

21 Claims, 14 Drawing Sheets

(51) Int. Cl.
*F02M 35/02* (2006.01)
*F02M 35/024* (2006.01)

(52) U.S. Cl.
CPC .. *F02M 35/0201* (2013.01); *F02M 35/02483* (2013.01); *B01D 2265/02* (2013.01); *B01D 2275/206* (2013.01); *B01D 2279/60* (2013.01)

(58) Field of Classification Search
CPC ...... B01D 2201/4046; B01D 2275/206; F01M 2013/0438; F02M 35/02483; F02M 35/0201
USPC ............ 55/498, 502, 510, 529; 210/90, 232, 210/493.2, 493.5
See application file for complete search history.

(56) References Cited

U.S. PATENT DOCUMENTS

| | | | |
|---|---|---|---|
| 6,261,334 | B1 | 7/2001 | Morgan et al. |
| 6,712,967 | B2 | 3/2004 | Gershenson |
| 8,499,749 | B2 * | 8/2013 | Mosset ............. B01D 46/0004 123/41.86 |
| 2006/0070945 | A1 | 4/2006 | Men et al. |
| 2010/0031940 | A1 * | 2/2010 | Mosset ............. B01D 46/0004 123/573 |
| 2011/0132816 | A1 * | 6/2011 | Vasilescu ............... B01D 29/21 210/90 |
| 2011/0272340 | A1 * | 11/2011 | Sasur ..................... B01D 29/21 210/232 |
| 2012/0060453 | A1 | 3/2012 | Holzmann et al. |
| 2013/0232934 | A1 * | 9/2013 | Baseotto ............ B01D 46/0086 55/502 |
| 2017/0368487 | A1 * | 12/2017 | Bannister ............... B01D 45/08 |

FOREIGN PATENT DOCUMENTS

| | | |
|---|---|---|
| CN | 102933278 A | 2/2013 |
| DE | 10 2011 110 759 A1 | 2/2013 |
| EP | 1 023 933 A2 | 8/2000 |
| EP | 1 203 609 A1 | 5/2002 |

OTHER PUBLICATIONS

First Office Action and translation cited in Chinese Patent Application No. 20150021736.X, dated, Jan. 17, 2018, 7 pages.
International Search Report and Written Opinion issued in PCT/US2015/029443, dated Jul. 28, 2015.

* cited by examiner

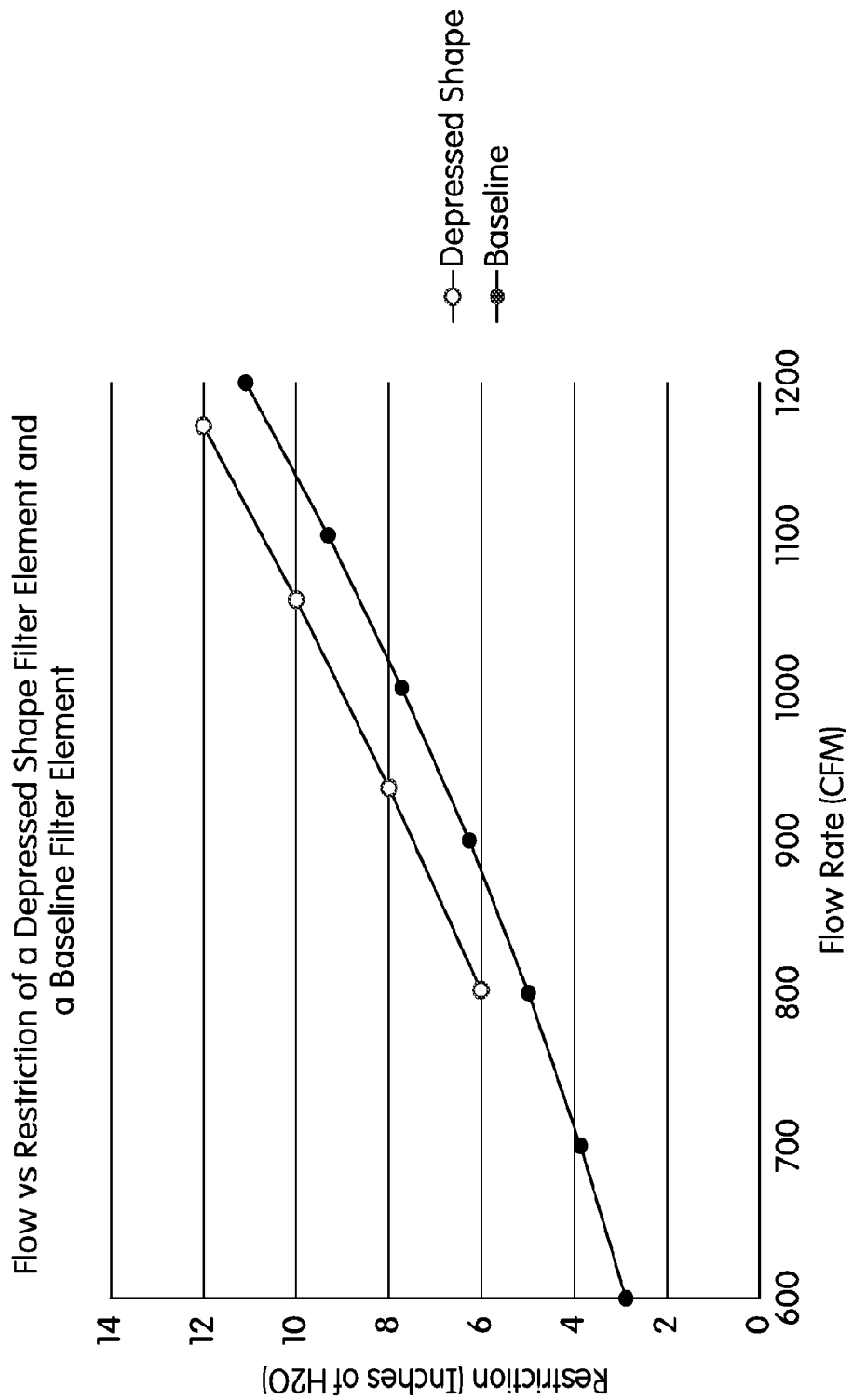

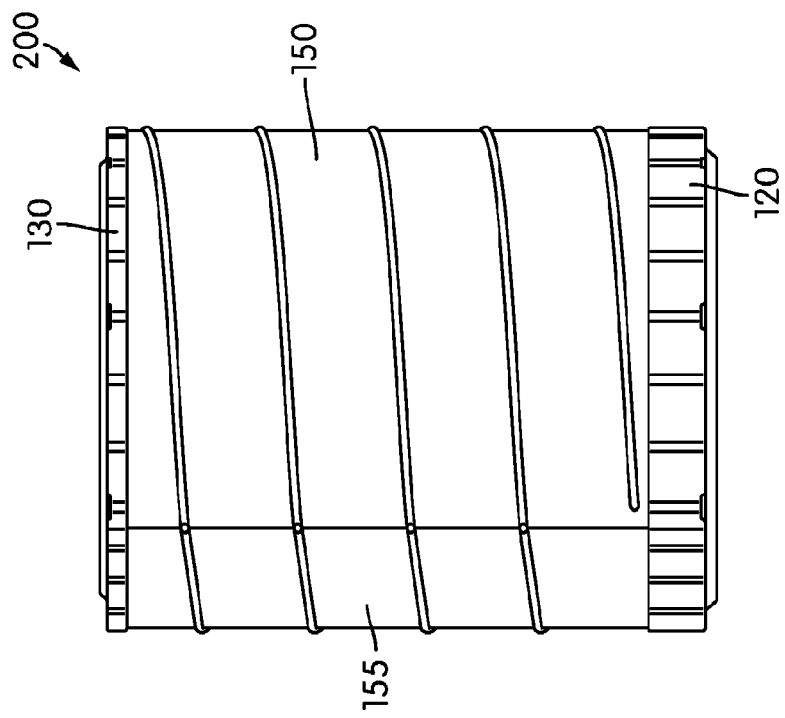
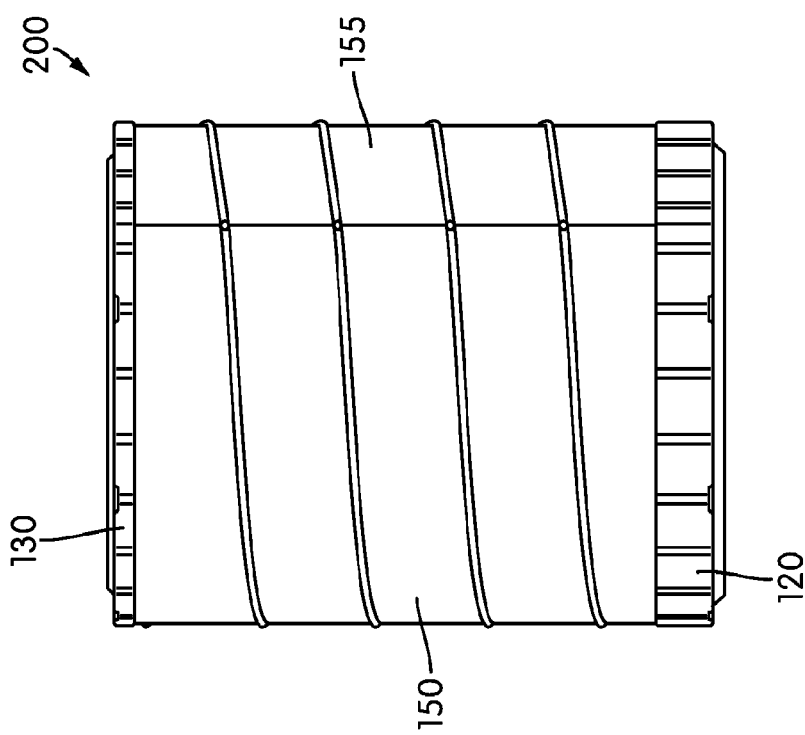

FILTER ELEMENT WITH DEPRESSED SIDE PORTION

CROSS REFERENCE TO RELATED APPLICATIONS

This application is a U.S. National Stage of PCT Patent Application No. PCT/US2015/029443, filed May 6, 2015, which claims priority to and the benefit of U.S. Provisional Patent Application No. 61/989,974, filed May 7, 2014, the entire disclosures of which are incorporated herein by reference.

FIELD

The present application relates generally to fluid filtration systems. More particularly, the present application relates to filtration systems for filtering air or other fluids before the air enters the chambers of an internal combustion engine.

BACKGROUND

Various types of fluid filtration systems, and particular "closed loop" air filtration systems, are known. In many such closed loop systems, air or other fluids are filtered by flowing through the filter media and into a hollow interior defined by the closed loop of filter media. After flowing through the filter media, the fluid flows axially through the hollow interior to an open axial end of the filter element.

SUMMARY

Various embodiments provide for a filter element comprising a filter media and an outer surface. The filter media is formed in a closed loop. The closed loop defines a hollow interior that extends along a longitudinal axis between a first end of the filter media and a second end of the filter media. The outer surface surrounds a perimeter of the filter element and is defined by a substantially circular first portion and at least one second portion. The first portion is substantially circular at a selected height of the filter media, and the at least one second portion is depressed relative to a circle defined by the substantially circular first portion at the selected height.

Various other embodiments provide for a filter assembly comprising a filter housing and a filter element. The filter element is positioned within the filter housing and includes a filter media formed in a closed loop. The closed loop defines a hollow interior that extends along a longitudinal axis between a first end of the filter media and a second end of the filter media. The filter element includes an outer surface surrounding a perimeter of the filter element. The outer surface is defined by a substantially circular first portion and at least one second portion. The first portion is substantially circular at a selected height of the filter media, and the at least one second portion is depressed relative to a circle defined by the substantially circular first portion at the selected height.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 8A is a graph of actual test data showing an improvement in restriction in a filter element with a depressed surface according to one embodiment compared to a cylindrical filter element.

FIGS. 9A-9H are top perspective, bottom perspective, top plan, bottom plan, left side elevational, right side elevational, front elevational, and rear elevational views, respectively, of a filter element according to another embodiment.

DETAILED DESCRIPTION

Figure 1:
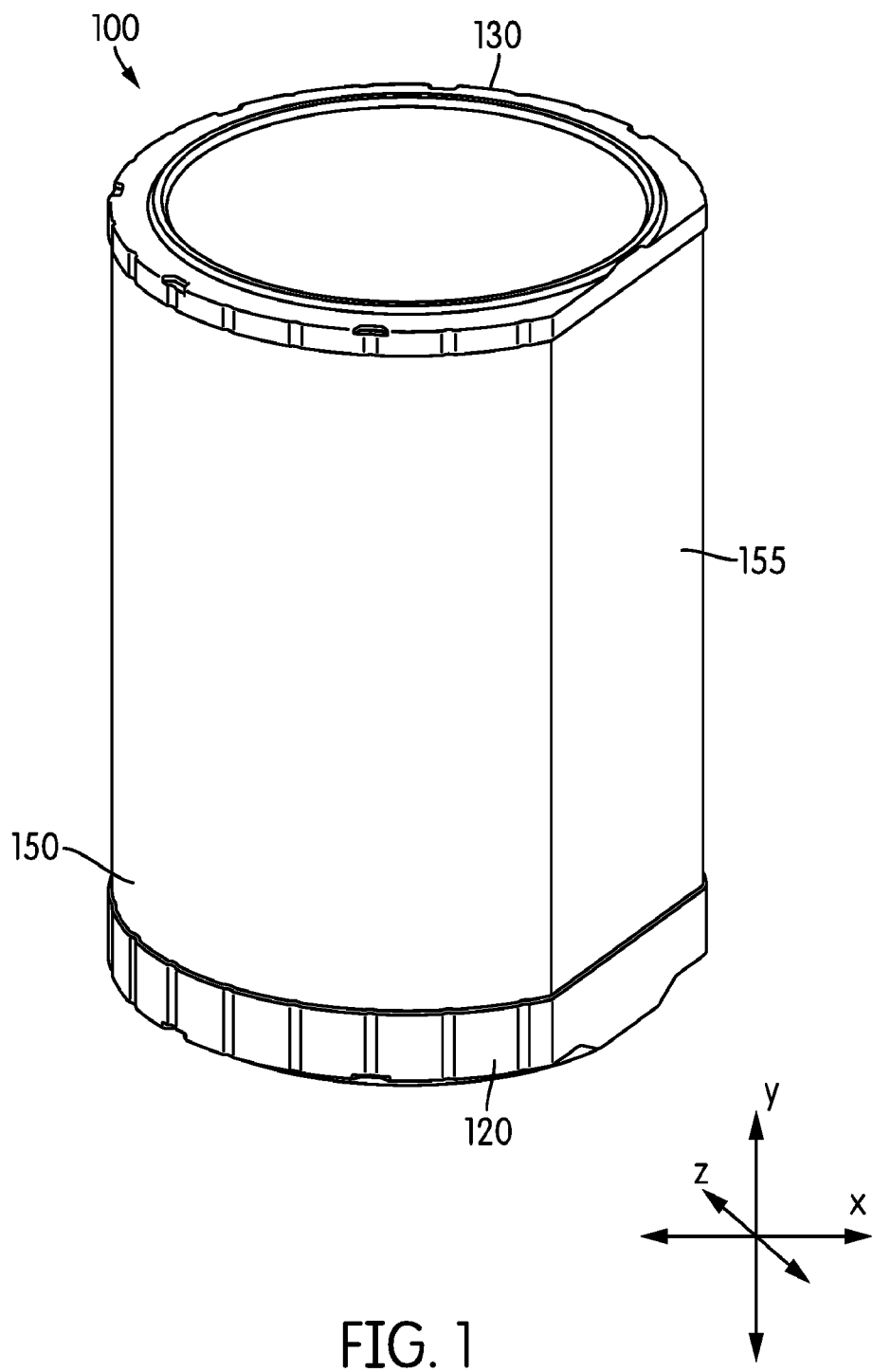
FIG. 1 is an isometric view of a filter element constructed in accordance with exemplary embodiment.
Figure 2:
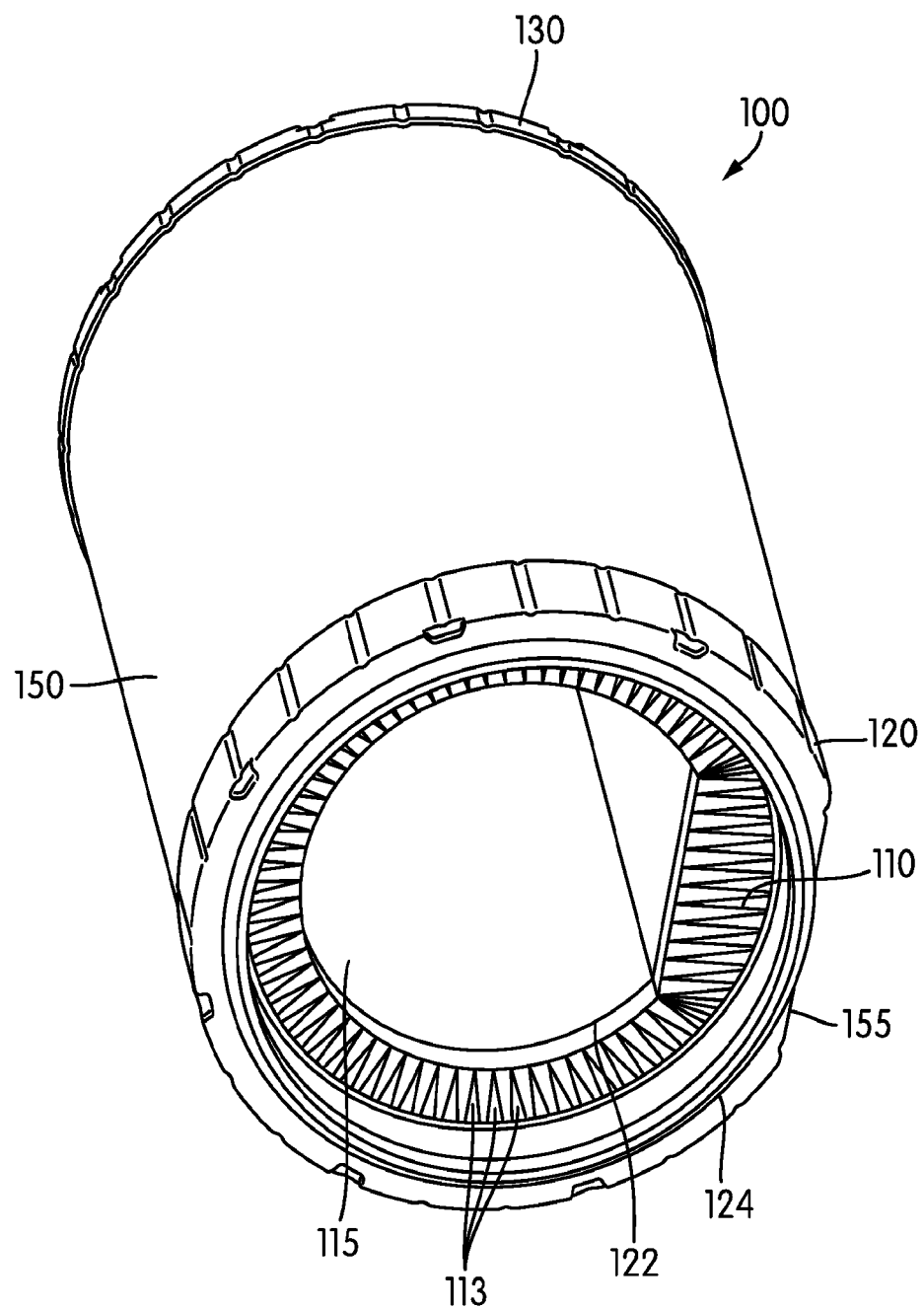
FIG. 2 is a lower isometric view showing an underside of the filter element of FIG. 1.

Various embodiments provide for a filter element that can be used in fluid filtration systems for filtering air or other fluids before the air enters the chambers of an internal combustion engine. The filter element is configured to result in reduced restriction across the filter element's filter media when in use. FIGS. 1 and 2 depict a filter element 100 constructed in accordance with a particular embodiment. The filter element 100 includes a filter media 110, a first end cap 120, and a second end cap 130. The filter media 110 comprises a closed loop of media and defines a hollow interior 115 along a longitudinal axis of the filter element 100. The longitudinal axis corresponds to the y-axis of the filter element 100, as shown in FIG. 1. The filter media 110 may comprise, for example, pleated filter media with a plurality of pleats 113 running along the entire longitudinal length or a portion of the longitudinal length of the filter media 110. Other types of filter media, such as "fluted" or grooved filter media, may alternatively be used. Still further, one specific type of filter media which may be used is pleated comprises tetrahedron channels, as described in U.S. Pat. No. 8,397,920 (the contents of which are incorporated herein by reference).

The first end cap 120 is coupled to a first end of the filter media 110. The first end cap 120 is an "open" end cap in that it includes a central flow passage 122 therein that communicates with the hollow interior 115 of the filter media 110. The first end cap 120 may comprise, for example, polyurethane and may be formed by various processes known in the art. The first end cap 120 includes a substantially circular inner sealing surface 124 that is sized and configured to seal against a standpipe (not shown).

The second end cap 130 is coupled to a second end of the filter media 110, substantially opposite the first end of the filter media 110. The second end cap is a "closed" end cap in that there is no opening or flow passage that permits air or other fluid to pass therethrough. The second end cap 130 may be formed from metal, polyurethane, or other materials. In other specific embodiments, however, the second cap may be "open."

The filter element 100 of FIGS. 1 and 2 includes an outer perimeter with two distinct portions. More particularly, the filter element 100 (specifically each the filter media 110, the first end cap 120, and the second end cap 130) possesses an outer surface surrounding a perimeter of the filter element 100 and defined by a first side portion 150 that is substantially circular at a particular or selected height of the filter element 100, and a second side portion 155, with the second portion 155 being "depressed,", e.g., out of round, indented, or non-circular, at the selected height of the filter element in a manner such that the outer surface of the second portion 155 is positioned inside a circle defined by the substantially circular first portion 150. In a particular embodiment, the second portion 155 is substantially flat. In other embodiments, however, the surface of the second portion 155 may not be flat. For example, the second portion 155 may have a curved, arced, semicircular or irregular shape, although still being depressed relative to a circle defined by the first portion 150. Accordingly, the shape or contour of the second portion 155 does not follow or match the shape or contour of the substantially circular first portion 150, with the outer surface of the second portion being located inside of a circle defined by the outer surface of the first portion 150. The first portion 150 and the second portion 155 may define the respective outer perimeters of the filter media 110.

The first portion 150 and the second portion 155 on the filter element 100 may form a variety of different shapes along the height or length of the filter element 100. For example, as shown in FIG. 1, the first portion 150 and the second portion 155 may be parallel to the longitudinal axis (i.e., the y-axis) of the filter element 100. Accordingly, the filter element 100 is a cylindrical element. More specifically, the diameter of the first portion 150 is relatively constant along the length of the filter media 110 such that the first portion 150 is substantially cylindrical along the length of the filter media 110. However, it is understood that the diameter of the first portion 150 may not be constant along the length of the filter media. More specifically, the first portion 150 may be angled relative to the longitudinal axis of the filter element 100. Accordingly, the filter element 100 may possess more of a conical shape. More specifically, the diameter of the first portion 150 (and of the outer surface of the filter media) may vary along the length of the filter media such that the first portion 150 may be conical along the length of the filter media.

According to another embodiment shown in FIGS. 9A-9H, the filter element 200 has multiple second portions 155. Similar to the filter element 100, the filter element 200 also has a filter media 110, a first end cap 120, a second end cap 130, and a hollow interior 115 along a longitudinal axis of the filter element 100.

Figure 9A:
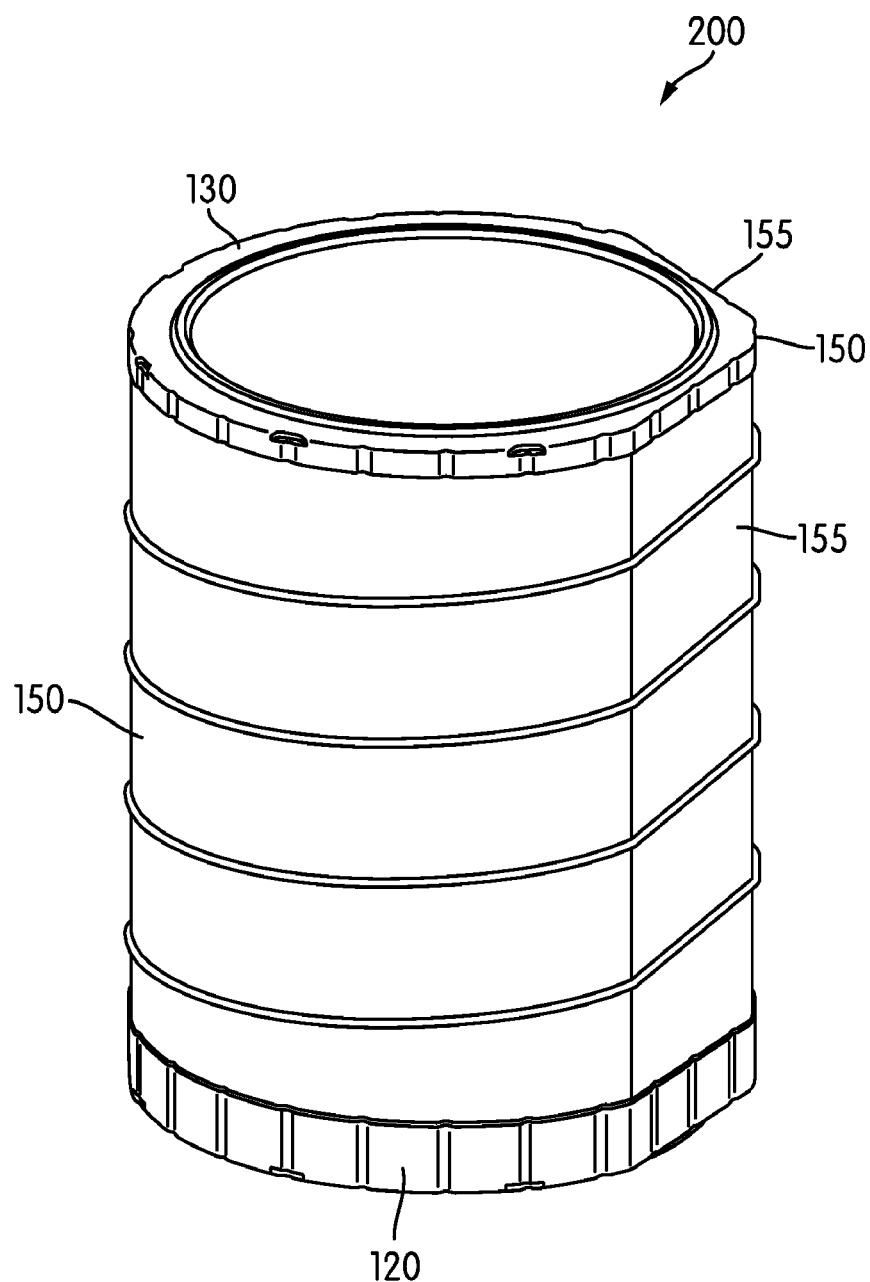
Figure 9B:
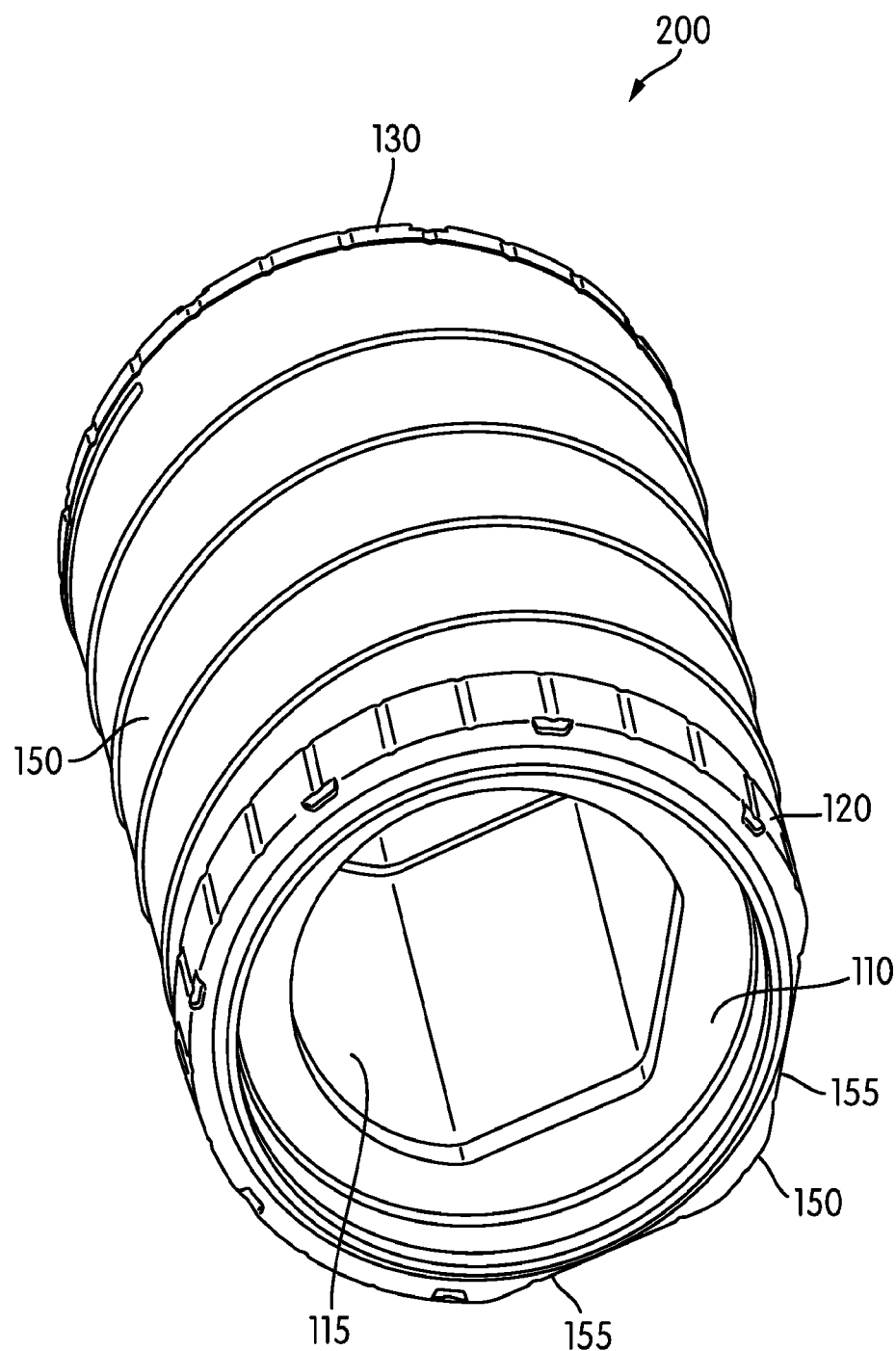
Figure 9D:
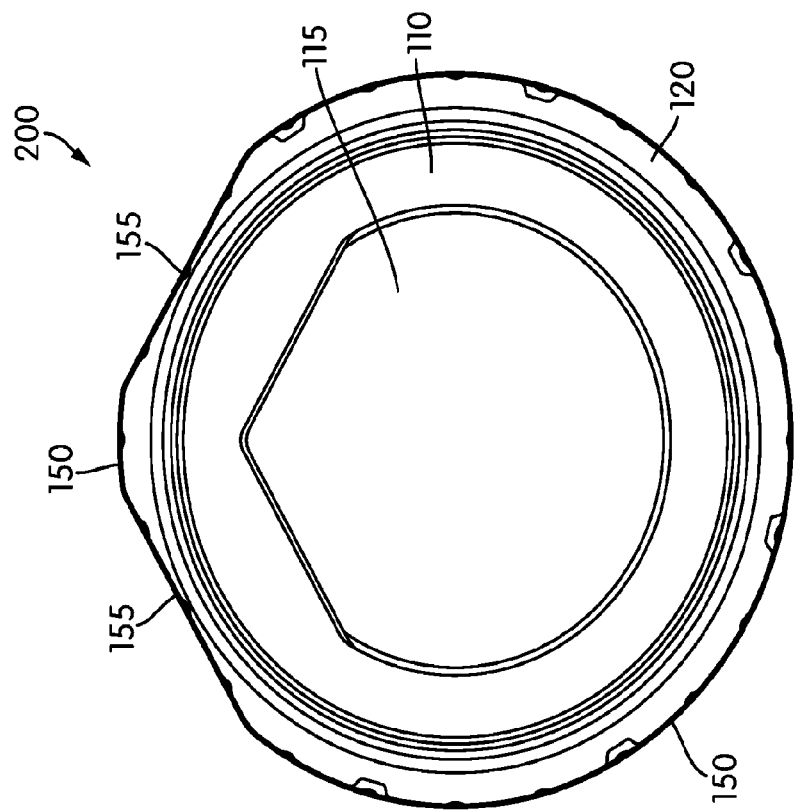
Figure 9C:
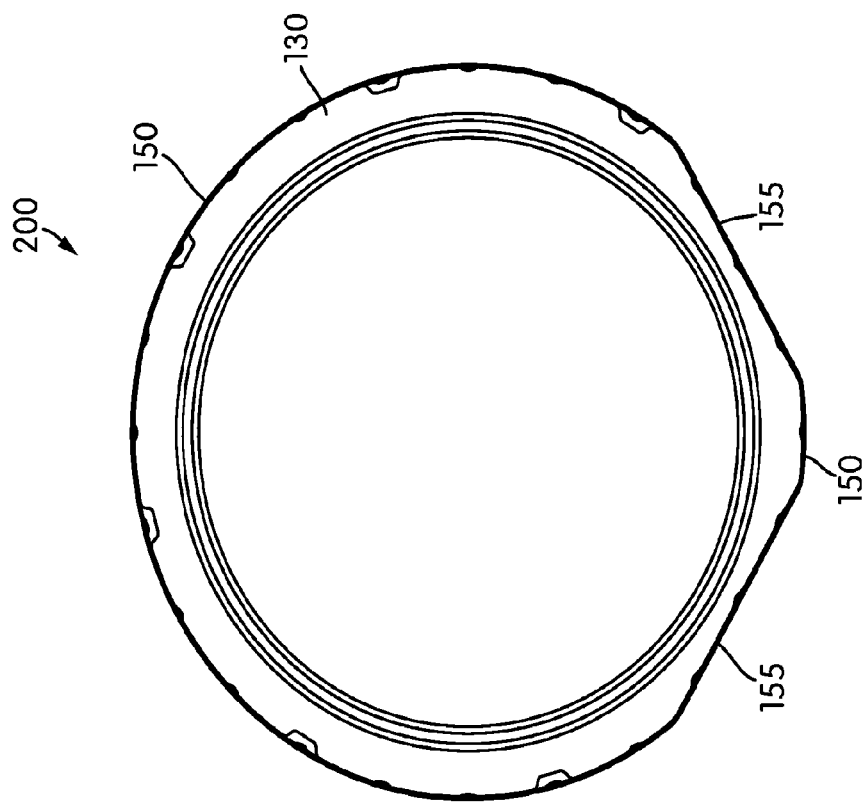
Figure 9H:
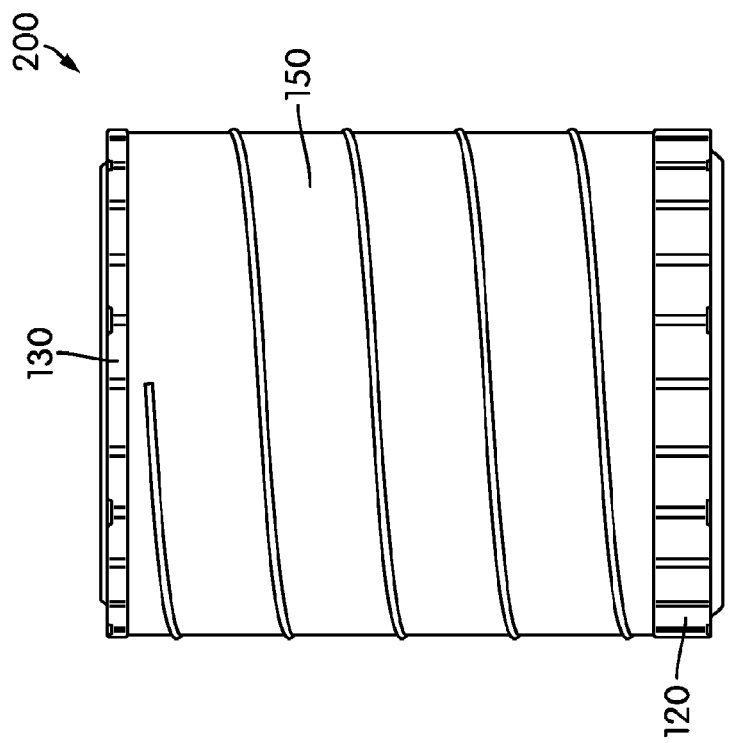
Figure 9G:
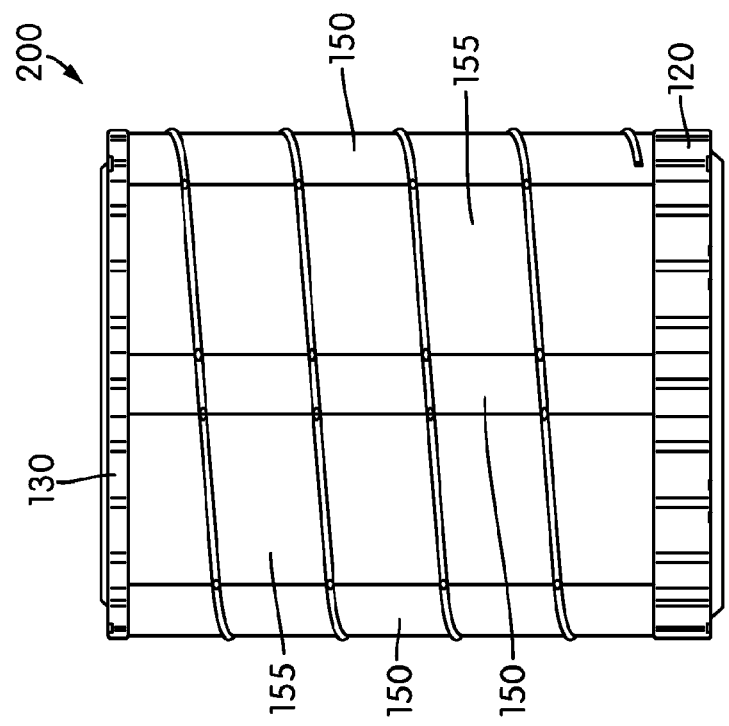

The filter element 200 shown in FIGS. 9A-9H has two second portions 155. However, it is understood that the filter element 200 may have at least two second portions 155. As shown in FIGS. 9C and 9D, the two second portions have substantially the same shape and contour (e.g., flat). However, it is understood that the two second portions 155 may have different shapes and contours from each other. The shapes and contours of the second portions 155 are different than that of the first portion 150.

The locations of the second portions 155 around the perimeter of the filter element 200 may vary according to the desired configuration. For example, as shown in FIGS. 9A-9H, the second portions 155 are separated or spaced apart from each other along the perimeter of the filter element 200. The first portion 150 is positioned between the second portions 155 in such a configuration. Accordingly, the first portion 150 is separated by the second portions 155 into different segments along the perimeter of the filter element 200. The second portions 155 may be spaced apart from each other at a variety of different distances. It is also understood that the second portions 155 may abut or be positioned next to each other along the perimeter of the filter element 200.

Figure 3:
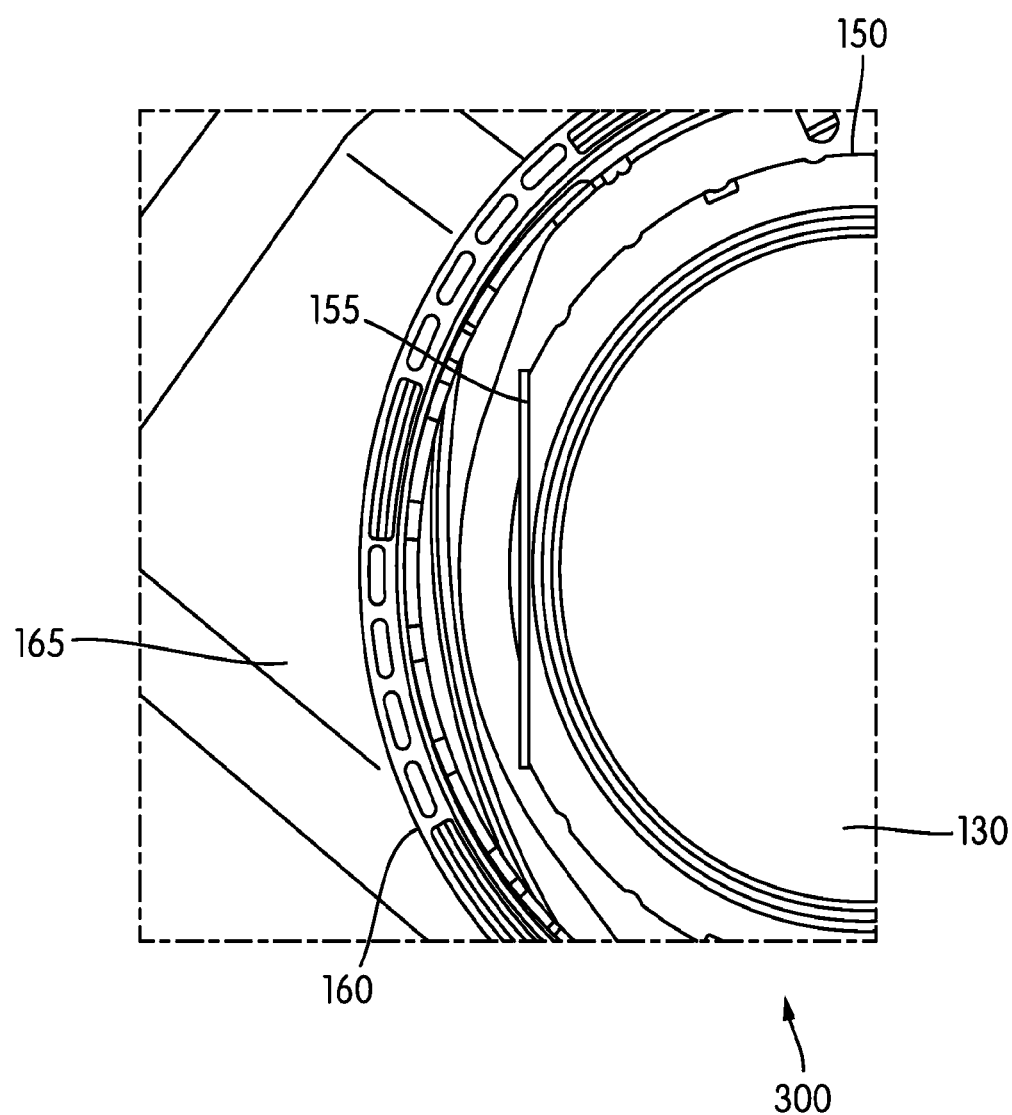
FIG. 3 is a partial cross-sectional view showing a top view of the filter element of FIG. 1 when positioned within a filter housing.

FIG. 3 is a partial cross-sectional view showing a top view of the filter element 100 of FIG. 1 when positioned within a filter housing 160. The filter housing 160 is configured to contain, house, or hold the filter element 100. As shown in FIG. 3, the filter element 100 is positioned within the filter housing 160 such that the second portion 155, representing the depressed side of the filter element 100, is adjacent an air inlet portion 165. In this arrangement, the depressed side of the filter element 100 (i.e., the second portion 155) serves as a keyed feature and ensures a proper filter element orientation within the filter housing 160. Accordingly, the second portion 155 may be aligned with or closest to the air inlet portion 165 (compared to the first portion 150) within the filter housing 160. Due to the depressed surface of the second portion 155, the exterior of the filter media 110 is slightly farther from the air inlet portion 165 than it otherwise would be if a substantially cylindrical filter element were used. This increase in distance between the exterior of the filter media 110 and the air inlet portion 165 reduces the restriction across the filter media 110 during use. It is understood that the air inlet portion 165 may be configured to be an air outlet such that the second portion 155 is relatively closer to the air outlet than the first portion 150.

Figure 4:
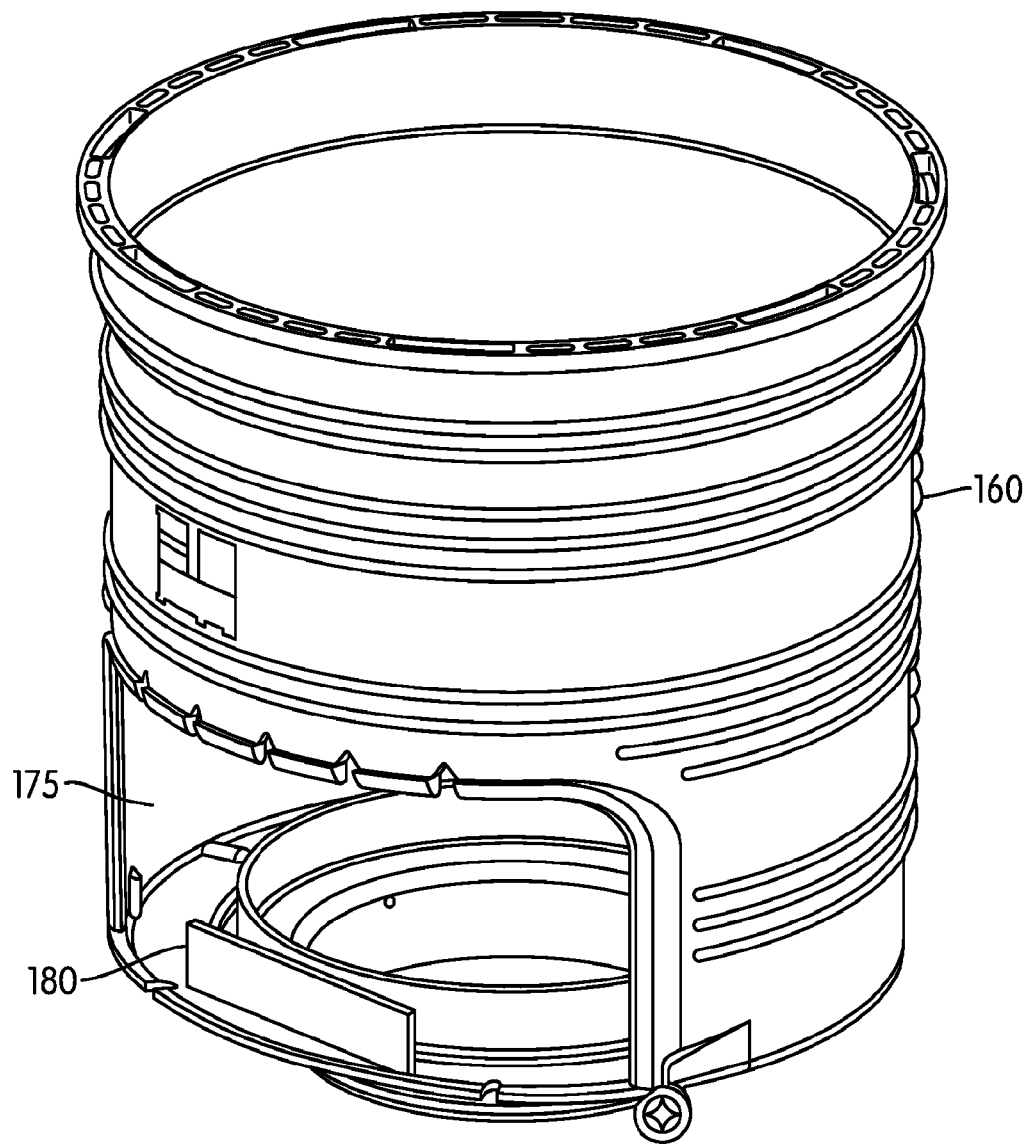
FIG. 4 is an isometric view of a filter housing within which the filter element of FIG. 1 may be positioned.
Figure 5:
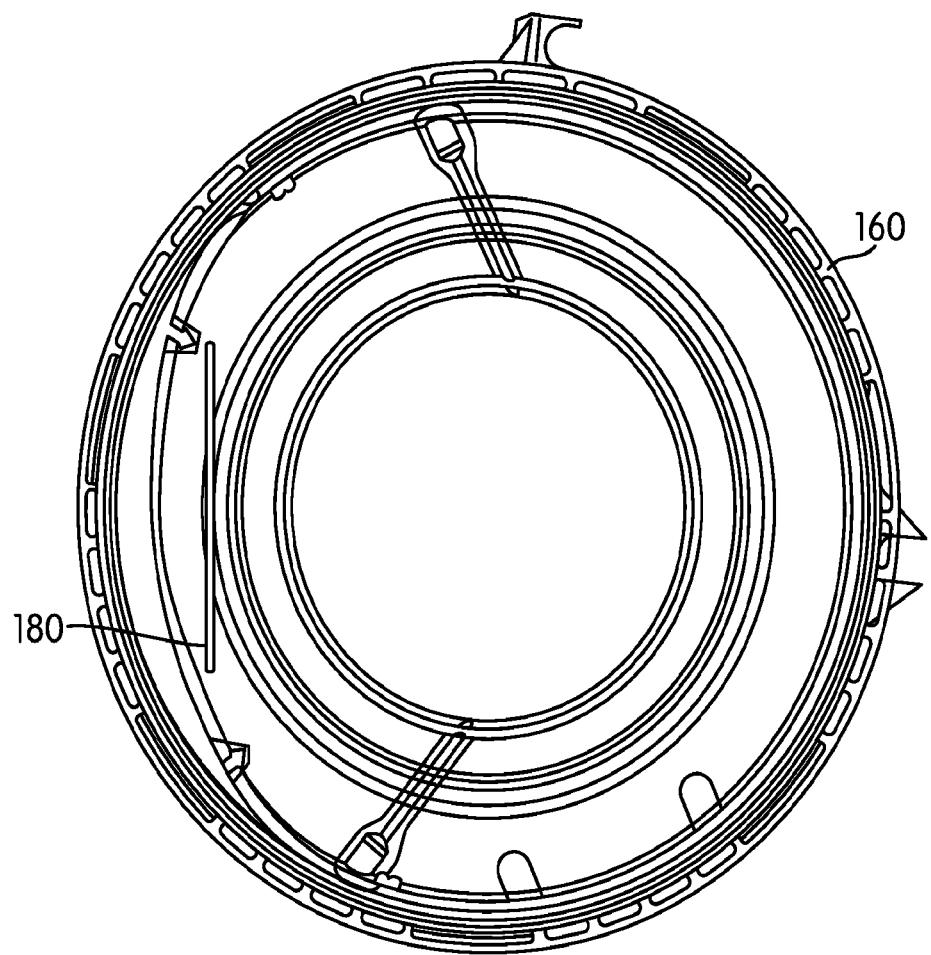
FIG. 5 is a top view of the filter housing of FIG. 4.
Figure 6:
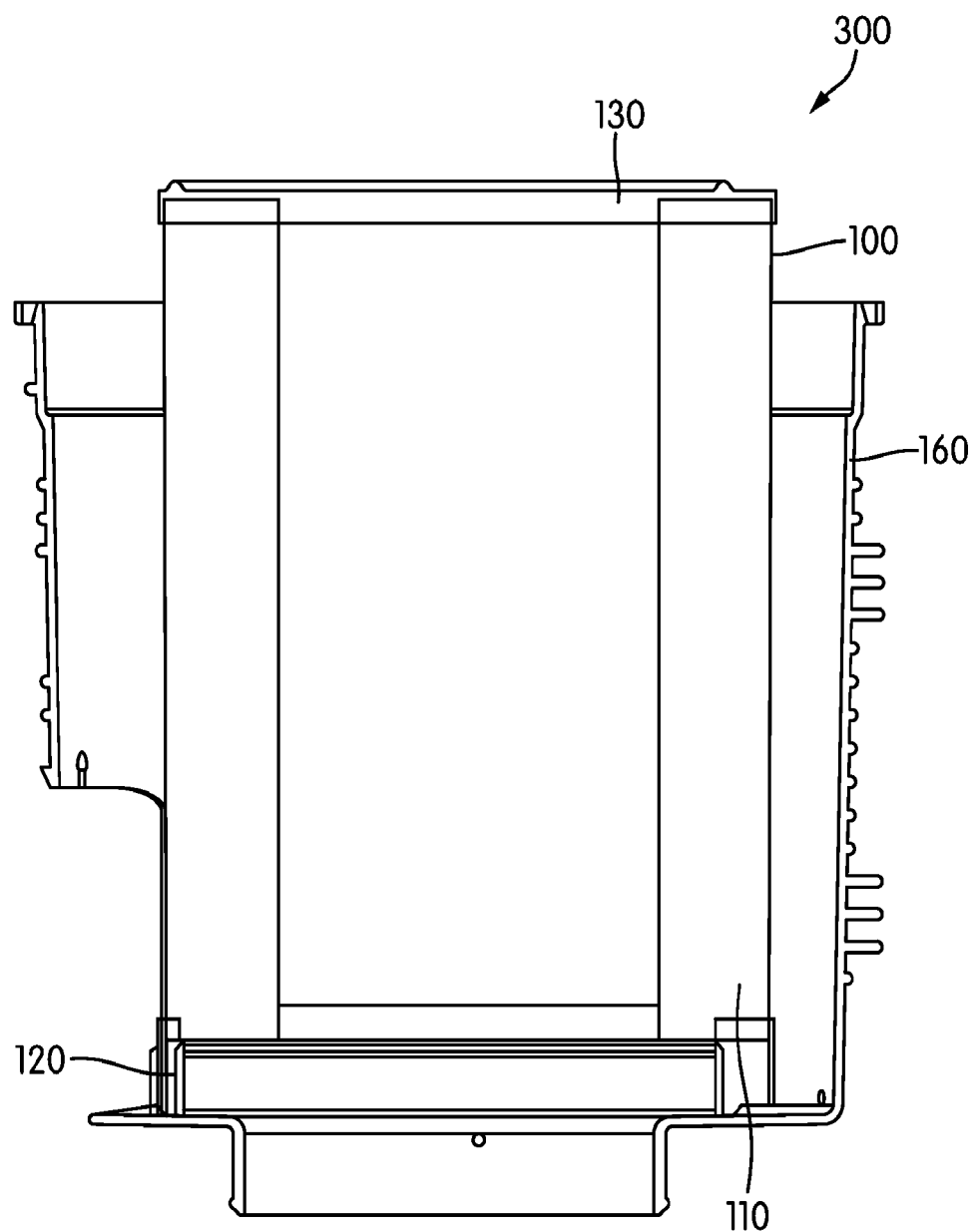
FIG. 6 is a cross-sectional view of a filter assembly including both the filter element of FIG. 1 and the filter housing of FIG. 4.

FIGS. 4-5 show different views of a representative filter housing 160 within which the filter element 100 may be positioned. As best shown in FIG. 4, the filter housing 160 includes a housing inlet opening 175 through which air or other fluid may travel before being filtered by the filter element 100. The housing inlet opening 175 may be configured to align with an air inlet portion 165. FIG. 6 is a cross-sectional view of an air filter assembly 300, which includes the filter element 100 (or the filter element 200) and the filter housing 160. FIG. 6 depicts the filter element 100 installed within the filter housing 160. In both FIGS. 4 and 5, a protrusion or keying feature 180 is shown, with the keying feature 180 being configured to interlock with the second portion 155 of the filter element 100. The keying feature 180 may further properly align or rotationally orient the second portion 155 of the filter element 100 within the housing 160. The geometry of the keying feature 180 may match or correspond to the geometry of the second portion 155 (e.g., flat, arced, noncircular, etc.) in order to ensure the proper orientation of the filter element 100. The keying feature 180 protrudes from a base portion of the filter housing 160, as shown in FIG. 4 to abut the second portion 155. However, it is understood that the keying feature 180 may protrude from a variety of different areas within the filter housing 160, such as along a portion of the inside surface of the sidewall of the filter housing 160. The filter housing 160 may optionally include multiple keying features 180 in order to interlock with the multiple second portions 155 of the filter element 200.

Figure 7:
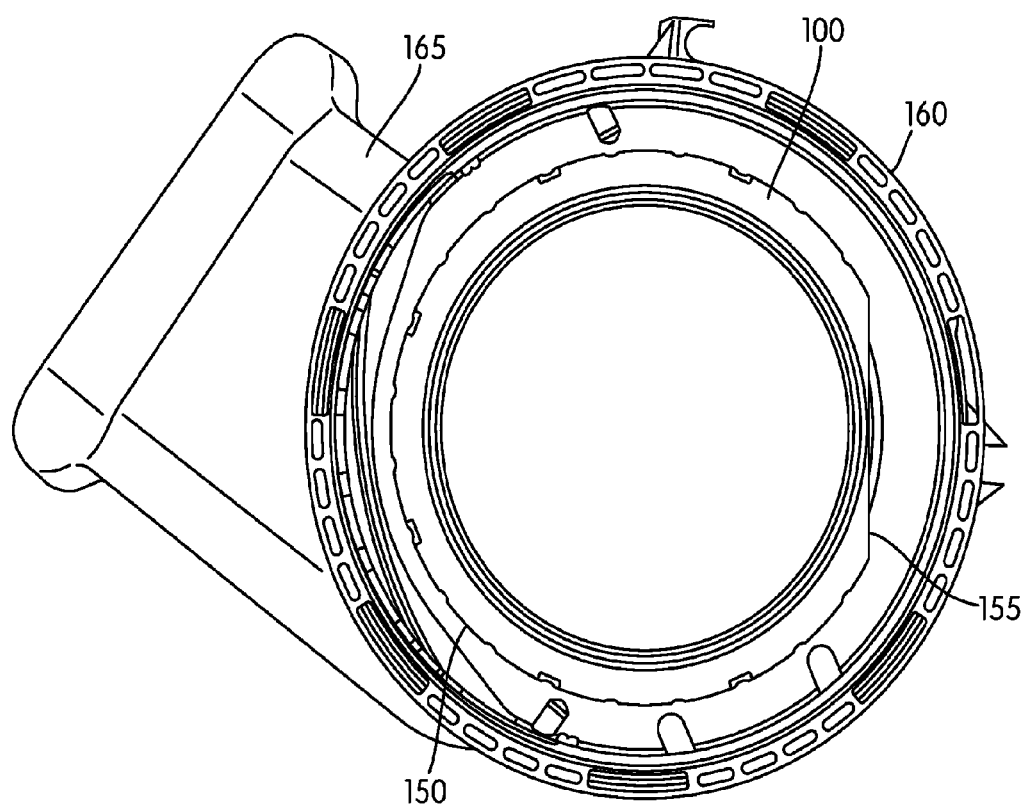
FIG. 7 is a cross-sectional view showing the filter element when located in an incorrect orientation within the filter housing.

The keying feature 180 may be strategically located within the filter housing 160 to orient the filter element 100 in the desired direction within the filter housing 160. For example, FIGS. 4-5 depict the keying feature 180 proximal to the housing inlet opening 175 in order to orient the second portion 155 to face toward to the air inlet portion 165. This ensures that the distance between the outer surface of the filter media 110 and the air inlet portion 165 is increased (relative to the situation where the filter element 100 does not include a depressed portion). In contrast, FIG. 7 demonstrates that the filter element 100 may be improperly oriented within the filter housing 160 if the keying feature 180 is not present. As shown in FIG. 7, it is possible for the second portion 155 to be improperly located relative to the air inlet portion 165 in such an arrangement, meaning that the distance from the outer surface of the filter media 110 to the air inlet portion 165 is reduced.

FIG. 8A is a graph representing actual, hard data of the improvement in restriction in a depressed shape filter element (e.g., the filter element 100, which includes the second portion 155), compared to a baseline filter element (e.g., a cylindrical filter element), within a housing. In arriving at the data depicted in FIG. 8A, a filter element with a flat side (i.e., "depressed shape") and a cylindrical filter element (i.e., "baseline) were used. The depressed shape filter element was positioned within the filter housing such that the depressed side or surface (e.g., the second portion 155) was positioned relatively close to the air inlet portion of the filter housing (compared to the equivalent of the first portion 150 of the depressed shape filter element).

The obtained data shows a restriction improvement with the depressed shape filter element compared to a baseline filter element (without a depression) as the flow rate increases. For example, the restriction of the depressed shape filter element is approximately 5 inches of $H_2O$ at a flow rate of 800 cubic feet per minute (CFM), whereas the restriction of the baseline filter element is 6 inches of $H_2O$ at a flow rate of 802 CFM. With a higher flow rate, the restriction of the depressed shape filter element is still less than the restriction of the baseline filter element. For example, the restriction of the depressed shape filter element is approximately 11 inches of $H_2O$ at a flow rate of 1200 CFM, whereas the restriction of the baseline filter element is 12 inches of $H_2O$ at a flow rate of 1171 CFM.

Figure 8B:
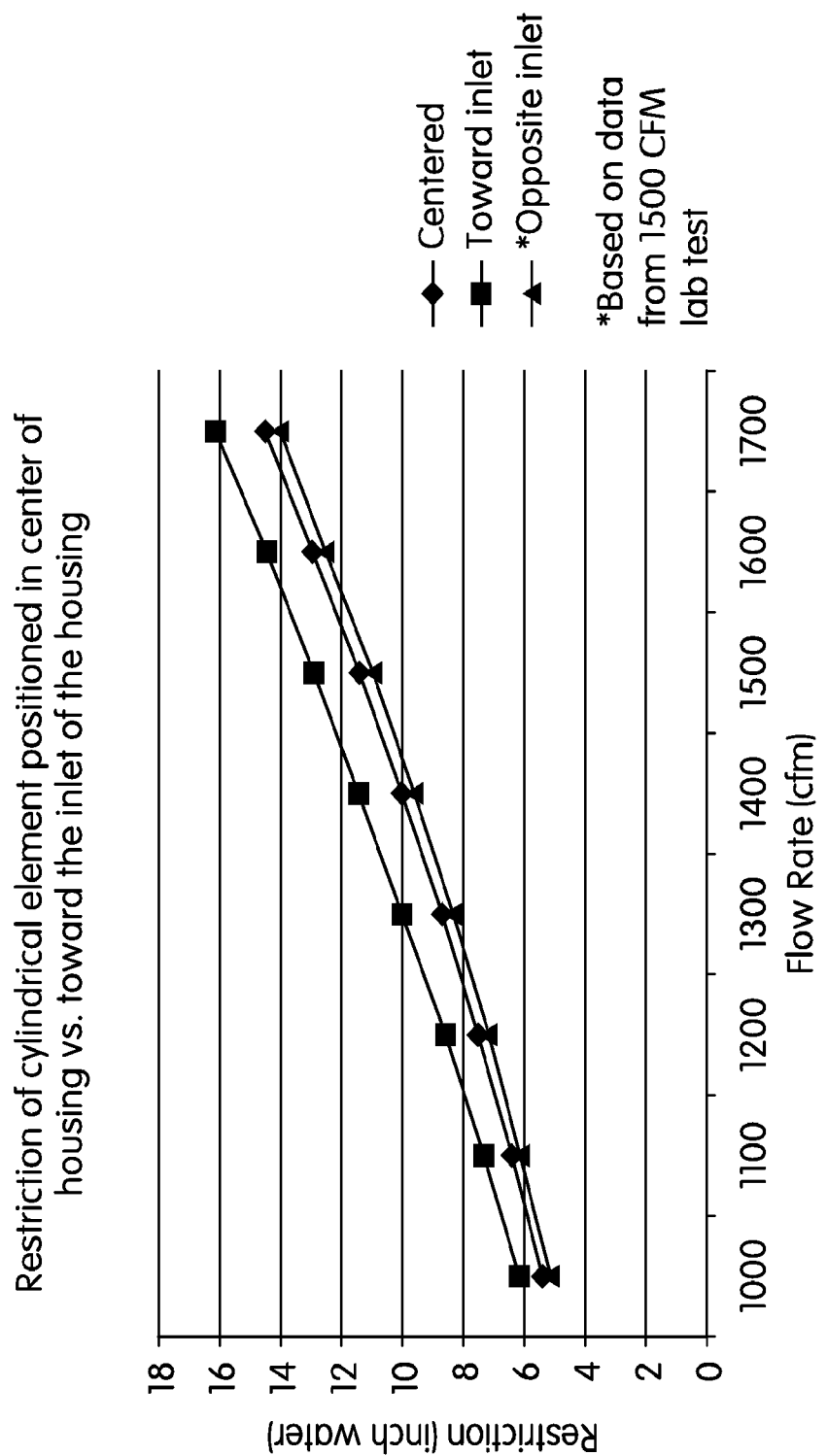
FIG. 8B is a graph showing an improvement in restriction when a filter element is placed in different positions within a filter housing in order to change the separation distance between the filter element and an air inlet portion of the filter housing.

FIG. 8B is a graph further representing a simulation of the improvement that may be achieved depressing a side of the filter element 100 of FIGS. 1-2. In arriving at the data depicted in FIG. 8B, a fully cylindrical filter element was used. However, the position of the filter element was adjusted within the filter housing in order to simulate the effect of having a depressed side or surface (similar to the second portion 155) on the filter element. The filter element was placed at three different positions relative to the air inlet of the filter housing, and measurements were taken with the system operating at 1500 CFM (the information for the other flow rates in FIG. 8B are extrapolated). In a first position, the filter element is "centered" within the housing (i.e., "centered"). In a second position, the filter element is positioned closer to the inlet than in the first position (i.e., "toward inlet"). In the third position, the filter element is positioned farther away from the inlet than in the first position (i.e., "opposite inlet"). This third position is representative of having a depressed side on the filter element that faces the air inlet of the housing.

The obtained data shows a restriction improvement of 1.92 inches of $H_2O$ at 1500 CFM when the initial element contact surface is positioned farthest from the inlet of the housing. The distance moved of the element was 0.7 inches for this test (relative to the filter element being closest to the inlet). A restriction improvement of 0.42 inches $H_2O$ was seen at 1500 CFM when the element was opposite of the inlet from center versus being at center. The distance moved of the element was 0.35 inches for this test comparison.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter element, comprising:
   a filter media formed in a closed loop, the closed loop defining a hollow interior extending along a longitudinal axis between a first end of the filter media and a second end of the filter media; and
   an outer surface surrounding a perimeter of the filter element, the outer surface defined by a substantially circular first portion and at least one second portion, the first portion being substantially circular at a selected height of the filter media, the at least one second portion being depressed relative to a circle defined by the substantially circular first portion at the selected height, the at least one second portion being substantially flat and extending between circumferential ends of the first portion.

2. The filter element of claim 1, wherein the outer surface includes two second portions that are spaced from each other along the perimeter of the filter element, wherein the first portion is located between the two second portions.

3. The filter element of claim 1, wherein the outer surface includes two second portions that abut each other along the perimeter of the filter element.

4. The filter element of claim 1, further comprising a first end cap coupled to the first end of the filter media, the first end cap including a central flow passage therein that communicates with the hollow interior of the filter media.

5. The filter element of claim 4, wherein first end cap includes a substantially circular inner sealing surface.

6. The filter element of claim 4, further comprising a second end cap coupled to the second end of the filter media.

7. The filter element of claim 1, wherein the filter media comprises a pleated filter media.

8. The filter element of claim 1, wherein a diameter of the first portion is constant along a length of the filter media.

9. The filter element of claim 1, wherein a diameter of the first portion is not constant along a length of the filter media.

10. A filter assembly, comprising:
a filter housing; and
a filter element positioned within the filter housing, the filter element including
a filter media formed in a closed loop, the closed loop defining a hollow interior extending along a longitudinal axis between a first end of the filter media and a second end of the filter media,
the filter media including an outer surface surrounding a perimeter of the filter element, the outer surface defined by a substantially circular first portion and at least one second portion, the first portion being substantially circular at a selected height of the filter media, the at least one second portion being depressed relative to a circle defined by the substantially circular first portion at the selected height, the at least one second portion being substantially flat and extending between circumferential ends of the first portion.

11. The filter assembly of claim 10, wherein the housing includes a keying feature that interlocks with the at least one second portion of the filter element.

12. The filter assembly of claim 11, wherein the keying feature rotationally orients the at least one second portion within the filter housing.

13. The filter assembly of claim 12, wherein the keying feature orients the filter element within the filter housing such that the second portion faces an air inlet portion.

14. The filter assembly of claim 10, wherein the outer surface of the filter element includes two second portions that are spaced from each other along the perimeter of the filter element.

15. The filter assembly of claim 14, wherein the first portion is located between the two second portions.

16. The filter assembly of claim 10, wherein the outer surface of the filter element includes two second portions that abut each other along the perimeter of the filter element.

17. The filter assembly of claim 10, wherein the filter element further comprising a first end cap coupled to the first end of the filter media, the first end cap including a central flow passage therein that communicates with the hollow interior of the filter media.

18. The filter assembly of claim 17, wherein first end cap includes a substantially circular inner sealing surface.

19. The filter assembly of claim 10, further comprising a second end cap coupled to the second end of the filter media.

20. The filter assembly of claim 10, wherein a diameter of the first portion is constant along a length of the filter media.

21. The filter assembly of claim 10, wherein a diameter of the first portion is not constant along a length of the filter media.

* * * * *